(12) United States Patent
Cervini (10) Patent No.: US 7,904,905 B2
(45) Date of Patent: Mar. 8, 2011

(54) SYSTEM AND METHOD FOR EFFICIENTLY EXECUTING SINGLE PROGRAM MULTIPLE DATA (SPMD) PROGRAMS

(75) Inventor: Stefano Cervini, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1204 days.

(21) Appl. No.: 10/714,179

(22) Filed: Nov. 14, 2003

(65) Prior Publication Data

US 2005/0108720 A1    May 19, 2005

(51) Int. Cl.
 G06F 9/46 (2006.01)
 G06F 15/76 (2006.01)
 G06F 9/40 (2006.01)
(52) U.S. Cl. .......... 718/101; 718/100; 712/10; 712/22; 712/200
(58) Field of Classification Search .......... 718/1–108; 712/10–22, 200, 201
 See application file for complete search history.

(56) References Cited

U.S. PATENT DOCUMENTS

| | | | | |
|---|---|---|---|---|
| 4,435,758 A | * | 3/1984 | Lorie et al. ............. | 712/22 |
| 4,754,393 A | * | 6/1988 | Kitson et al. ............ | 712/234 |
| 5,588,152 A | * | 12/1996 | Dapp et al. ............. | 712/16 |
| 5,710,935 A | * | 1/1998 | Barker et al. ........... | 712/20 |
| 5,828,894 A | * | 10/1998 | Wilkinson et al. ....... | 712/20 |
| 5,881,284 A | * | 3/1999 | Kubo ..................... | 718/100 |
| 5,966,528 A | * | 10/1999 | Wilkinson et al. ....... | 712/222 |
| 6,006,349 A | * | 12/1999 | Fujisaki ................. | 714/738 |
| 6,094,715 A | * | 7/2000 | Wilkinson et al. ....... | 712/20 |
| 6,247,036 B1 | * | 6/2001 | Landers et al. .......... | 708/603 |
| 6,269,478 B1 | * | 7/2001 | Lautenbach-Lampe et al. ................. | 717/127 |
| 6,304,891 B1 | * | 10/2001 | Anderson et al. ........ | 718/107 |
| 6,470,441 B1 | * | 10/2002 | Pechanek et al. ........ | 712/15 |
| 6,823,517 B1 | * | 11/2004 | Kalman ................ | 718/108 |
| 7,653,710 B2 | * | 1/2010 | Scheuermann et al. .... | 709/223 |
| 2002/0002573 A1 | * | 1/2002 | Landers et al. .......... | 708/501 |
| 2004/0073773 A1 | * | 4/2004 | Demjanenko ........... | 712/7 |
| 2005/0071843 A1 | * | 3/2005 | Guo et al. ............... | 718/101 |

OTHER PUBLICATIONS

Hansoo Kim, Woo-Seung Yang, Myoung-cheol Shin, Seung-Jai Min, Seong-Ok Bae, In-cheol Park; Multi-thread VLIW processor architecture for HDTV decoding; IEEE 2000 Custom Integrated Circuits Comference.*

* cited by examiner

Primary Examiner — Li B Zhen
Assistant Examiner — Abdullah Al Kawsar
(74) Attorney, Agent, or Firm — Lisa K. Jorgenson; William A. Munck (57) ABSTRACT

A system and method is disclosed for efficiently executing single program multiple data (SPMD) programs in a microprocessor. A micro single instruction multiple data (SIMD) unit is located within the microprocessor. A job buffer that is coupled to the micro SIMD unit dynamically allocates tasks to the micro SIMD unit. The SPMD programs each comprise a plurality of input data streams having moderate diversification of control flows. The system executes each SPMD program once for each input data stream of the plurality of input data streams.

26 Claims, 8 Drawing Sheets

PROGRAM $P_1$
EIGHT (8) JOBS

PROGRAM $P_2$
EIGHT (8) JOBS

SYSTEM AND METHOD FOR EFFICIENTLY EXECUTING SINGLE PROGRAM MULTIPLE DATA (SPMD) PROGRAMS

TECHNICAL FIELD OF THE INVENTION

The present invention is generally directed to microprocessor architectures that are capable of high performance parallel computing, more specifically, to a system and method for efficiently executing single program multiple data (SPMD) programs in a microprocessor.

BACKGROUND OF THE INVENTION

The present invention comprises a new microprocessor architecture for high performance parallel computing. The present invention is intended to provide high performance at low cost for parallel computing problems characterized by an abundant data level parallelism and a moderate but not negligible diversification of control flows observed during the execution of processes associated with a number of data streams. These types of problems are not efficiently supported by the two main prior art paradigms of parallel computing known as Single Instruction Multiple Data (SIMD) and Multiple Instruction Multiple Data (MIMD). As will be more fully discussed, the present invention introduces a new system and method to more appropriately and efficiently solve this class of problems. The new system and method is called Single Program Multiple Data (SPMD).

The SPMD system and method executes the same program once for each one of the input data streams, possibly occurring in a variety of control flows due to the presence of data dependent control flow constructs in the program. The SPMD system and method contrasts with prior art SIMD paradigms in that the instruction streams are independently generated for each data stream, as opposed to being common to all of the data streams as is the case in the SIMD paradigm. On the other hand, the SPMD system and method differs from the MIMD paradigm in that the independent instruction streams are generated from the same program as opposed to being potentially generated by different programs as is the case in prior art MIMD paradigms.

Strictly speaking, the SIMD paradigm and the MIMD paradigm are hardware paradigms. But the two terms (SIMD and MIMD) are extensively used in the literature (sometimes generating ambiguity) to also refer to the classes of problems that respectively best match the hardware paradigms. Unlike the SIMD and MIMD paradigms, the SPMD system and method is not a hardware paradigm in that the SPMD system and method does not refer to any precise hardware model.

The prior art SIMD category includes parallel problems whose data streams do not produce any control flow diversification, and the prior art MIMD category includes parallel problems whose instruction streams are totally uncorrelated, mostly generated by different programs indeed. It is worth noting that when referring to classes of problems, the SIMD class is a subset of the SPMD class. In turn, the non-SIMD part of the SPMD class is a subset of the MIMD class. Such non-SIMD SPMD problems that are limited to a "moderate, yet not negligible" control flow diversification represent the class of problems addressed by the SPMD system and method of the present invention.

Figure 1:
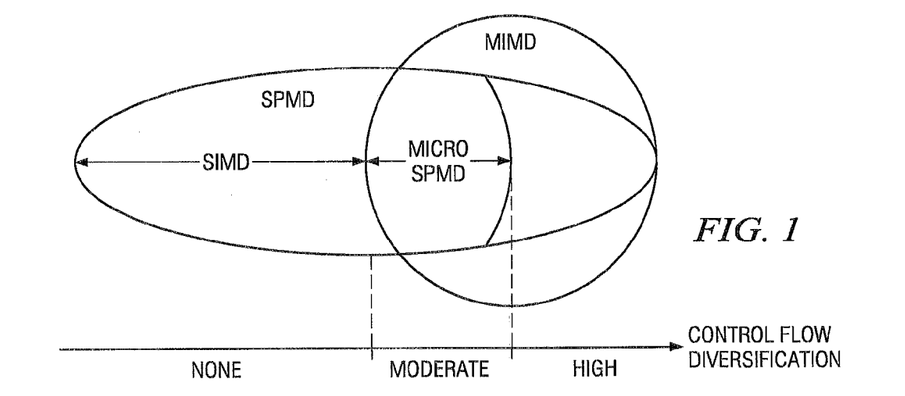
FIG. 1 illustrates a diagram that shows a class of problems that is addressed by the present invention.

This may be more clearly seen with reference to FIG. 1. The subset labeled "Micro SPMD" refers to a portion of the intersection of the set labeled SPMD and the set labeled MIMD. The "Micro SPMD" portion represents those problems that have "moderate, yet not negligible" control flow diversification.

The likelihood that the instruction streams, although independent, show some sort of similarities, is critical to the efficiency of the architecture of the present invention. For this reason it is explicitly required that the control flow diversification (i.e., the proliferation of control flows generated from a common program) be limited. In other words, it is required that there be sufficient control flow redundancy in the application.

An extension of the SPMD system and method consists in having a number of programs each being executed on a number of input data streams. The number of data streams associated with each program is arbitrary and independent of each other, but a reasonable assumption is that most programs will be executed on a number of data streams significantly larger than a certain threshold. Such a threshold is a characteristic of the problem and refers to the "program granularity" of the problem. Even though the program granularity is a factor to be taken into account when applying the present invention to a specific problem, as long as the program granularity is a reasonably high number (for instance, eight (8) or higher), it does not have any impact over the main concepts of the invention. For this reason, this aspect will not be considered any further.

What matters most is that all of the programs are characterized by an abundant data level parallelism, regardless of the program granularity (again, as long as the program granularity is not too low).

This extension of the SPMD system and method is referred to as the "Multi-SPMD system and method." The architecture of the present invention addresses the efficiency issues related to the design of a microprocessor architecture supporting Multi-SPMD problems.

In general the performance of a microprocessor depends upon its ability to keep all of its functional units (FUs) busy most of the time. This is an ultimate objective of any microprocessor design. An alternative way to state this objective is to state that the objective is to efficiently supply the functional units (FUs) with the operands and control signals they need in order to execute the instructions. The notion of efficiency involves such factors as silicon area, power dissipation and computing speed. The system and method present invention is designed to achieve increased efficiency in these areas.

As previously mentioned, the SPMD system and method does not have a specific hardware counterpart. Known solutions to the execution of SPMD problems employ prior art SIMD machines with enhanced flexibility. Existing architectures of prior art SIMD machines comprise arrays of Processing Elements (PE) to which an instruction stream is broadcast by an Array Control Unit (ACU). At any time, the currently broadcast instruction is executed on each PE using local data (i.e., the data corresponding to the data stream associated with each individual PE). Although the execution of each single instruction is independent of each PE, all of the PEs are required to start the execution synchronously. This dynamic of instruction execution is referred to as the "lockstep execution mode" and it is responsible for the major source of inefficiency of prior art SIMD machines when used to execute SPMD programs.

To better explain why this occurs the flow of control of a program execution will first be defined. Then the program control flow will be related to the source of inefficiency. The execution of an instruction causes a change of the internal state of the machine. The subset of the state that is visible to the programmer is called the architectural state of the machine. The instruction stream is generated by properly fetching instructions from the program compiled code according to the value of the Program Counter (PC). The PC always points to the following instruction in the program order unless the instruction previously executed did not explicitly change it. In a programming language (for example, the programming language C) there are specific constructs that force the PC to take on a different value than the simple sequential increase. In general these constructs contain a logic expression that conditionally (that is, depending on the value of the logic expression) produce a change of the PC. The program control flow is the sequence of the values taken on by the PC during the program execution. When executing the same program on a number of different data streams it is possible to observe a different control flow for each of the data streams, due to the different values that the logic expressions contained in the branch instructions may take on.

The performance attainable by a prior art SIMD machine is greatly impoverished when executing a program on data streams that are significantly different. Intuitively, the explanation of this result is that in the presence of strong control flow divergence, due to the lockstep execution mode, the PEs, alternatively to periods of execution, are forced to stand idle until all the PEs have terminated the execution of the current instruction. These waiting periods are due to the fact that only a portion of the PEs can participate in the execution of the current instruction, depending on whether their respective control flow shares the same instruction being currently broadcast.

Moreover, if a PE is inactive on a given instruction broadcast, the ACU will later on have to broadcast instructions belonging to the control flow of that PE, thus resulting in the other PEs becoming idle. In other words, the PEs are alternately granted access to their own control flows and unless all of the control flows are equal, the PEs will be alternately required to wait for an amount of time which is proportional to the number of existing unique control flows.

Prior art Micro-SIMD architectures have been used in instances where the SIMD paradigm has been combined with single chip integration. Such Micro-SIMD architectures have been demonstrated to offer high efficiency when dealing with a data level parallelism. In a paper by R. B. Lee entitled "Efficiency of Micro-SIMD Architectures and Index-Mapped Data for Media Processors" published in the Proceedings of Media Processors 1999, IS T-SPIE Symposium on Electric Imaging: Science and Technology, pp. 34-46, Jan. 25-29, 1999, Micro-SIMD architectures are described and compared with the other known parallel architectures such as the MIMD, SIMD, Superscalar and Very Long Instruction Word (VLIW) architectures.

Figure 2A:
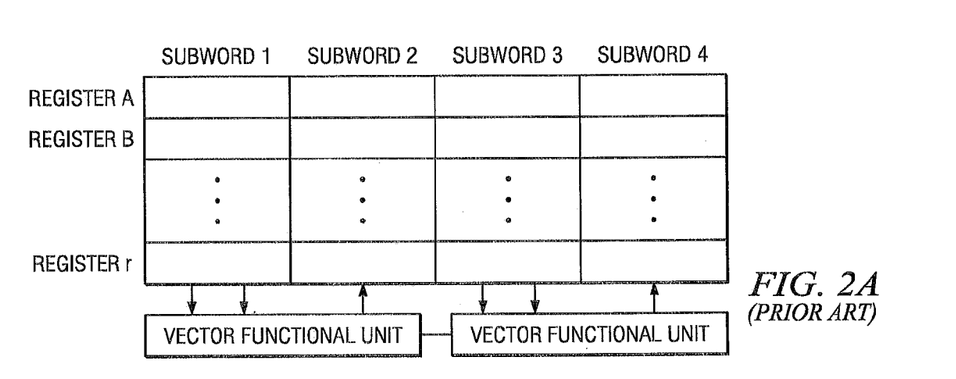
FIG. 2A illustrates a register file and vector functional units of a prior art Micro-SIMD microprocessor.

The basic concept involves treating each word of the register file as being completely composed of a number of subwords each containing data valid for a different PE. This concept is illustrated in FIG. 2. In FIG. 2 the register file is made up of registers containing four subwords. The register file is shared among all the functional units (FUs) attached to it. When a FU executes an instruction (for example, a multiply instruction) it actually performs four multiplications using as operands pairs of subwords contained in two distinct registers. The FUs carry out vector operations and can therefore be referred to as "vector FUs" to distinguish them from the "scalar FUs" (the four multipliers in the example) that they are made up of. The number of scalar FUs contained in the vector FUs is referred to as the "size" of the Micro-SIMD unit, and is indicated with the parameter "m" throughout this patent document. The register file is said to be "shared and partitioned" in that each one of the "r" registers is shared along with the FUs axis (each register can be an operand of any FU) but the registers are partitioned into subwords each associated to one and only one of the "m" scalar operators in the FUs.

The advantages of the Micro-SIMD structure are twofold. First, the register file is smaller and has a shorter access time as compared to a register file with "m times r" registers independently accessible and with the same number of FUs. The register file access time is often regarded as being the critical path in microprocessor design, thus limiting the microprocessor cycle time (clock rate).

Second, the Micro-SIMD structure is less susceptible to suffer from wire delay problems than other architectures. The trend of performance of future microprocessors has started to show that the most limiting bottleneck will shift from gate speed to wire delay. In the near future, a single wire will take tens of cycles to cross the entire area of a die, making synchronous single-clocked techniques highly unattractive. In the attempt to avoid long wires, solutions in which the chip area is partitioned in multiple regions each working asynchronously with respect to each other will be favored over fully synchronous solutions. Because of the packed nature of the Micro-SIMD structure, wire lengths are much shorter than what could possibly be obtained with a conventional SIMD architecture. Nevertheless, it retains the advantages of SIMD machines consisting in a shared control unit.

The inefficiencies are the prior art SIMD machines and the prior art Micro-SIMD machines will now be discussed. The first major source of inefficiency is that of the PE array underutilization that is inherent in the execution of the SPMD programs. The second major source of inefficiency is the difficulty involved in supporting simultaneous multi-threading.

The first major source of inefficiency will be discussed first. One problem that arises when an SPMD program is executed on a SIMD machine is flexibly handling branching operations. Because each PE executes the same program but on different data, in general not all the PEs will jump to the same instruction when encountering a branch instruction. To solve this problem with prior art techniques requires the adoption of one of the two following solutions.

The first solution involves using an "Active Flag Matrix" of bits with as many columns as the number of PEs and as many rows as the number of nested branches supported. The matrix is treated as a Last In First Out (LIFO) stack, growing in the row dimension. Entire rows are pushed in and popped out of the matrix. A new row is pushed into the stack any time a branch instruction is encountered, while it is popped out whenever an "end_if" instruction is executed. At any time the row on top of the matrix (the one last pushed in) represents the activation mask of the PE array, in particular the "n-th" bit of the last row represents the activation status of the "n-th" PE. This technique poses a limit to the maximum level of nested branches allowed in the program.

The second solution involves using a "Target Address Register (TGR)" and an "Active Flag Bit" both local to the PEs. Each PE locally decides whether or not to execute the delivered instruction. This technique is described in a paper by Y. Takahashi entitled "A Mechanism for SIMD Execution of SPMD Programs" published in the Proceedings of High Performance Computing, Asia 1997, Seoul, Korea, pp. 529-534, 1997.

Figure 2B:
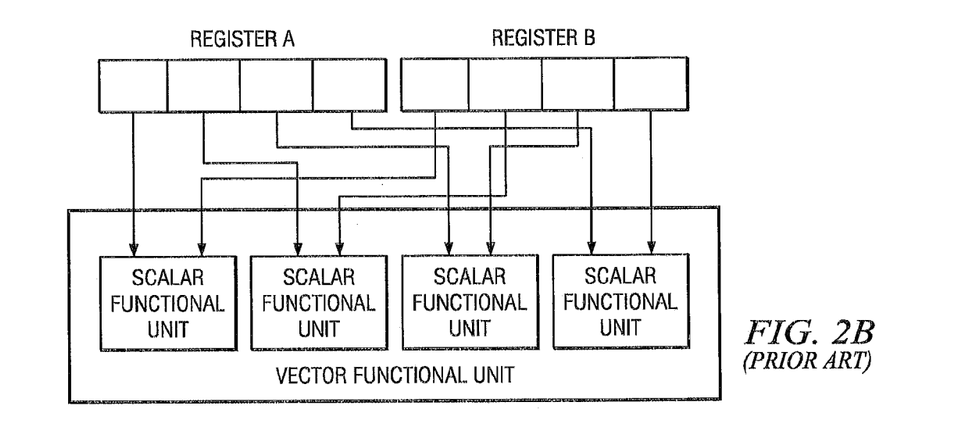
FIG. 2B illustrates two registers of a register file and the connection of the two registers with scalar functional units of a vector functional unit of a prior art Micro-SIMD microprocessor.

The branching problem has its roots in the lockstep execution mode. Therefore, the branching problem is generated by the very nature of SIMD machines. Another problem that arises from executing SPMD programs on SIMD machines applies only to the specific class of Micro-SIMD architectures. This problem relates to the write-back stage of the execution pipeline. In a register-to-register architecture, instructions require the availability of one source operand (for unary operations) or two source operands (for binary operations) from the register file and write the result of the operation back to a destination address of the register file. Because of the partitioned structure of the register file, every register contains data for all of the PEs. This is illustrated in FIG. 2B.

For this reason two reads of the register file provides all the data for the SIMD instruction. When an instruction is to be executed for only a portion of the PEs (i.e., when the activation mask reveals some inactive PEs), then the write-back of the result of the instruction in the destination register has to be selectively applied only to the subwords associated with the active PEs. Otherwise, a full register write (i.e., not selective) would possibly overwrite the data (which is still valid) associated with the subwords of the inactive PEs.

To better understand this problem, consider the simple code set forth in TABLE ONE. With a non-selective write back the registers "r1" and "r2" written during execution of the "else" branch would overlap the correct value that was previously assigned during the execution of the "then" part.

TABLE ONE

| 1 | if (cnd) then |
| 2 | r1 = 2 * r0 |
| 3 | r2 = 3 |
| 4 | else |
| 5 | r1 = 3 * r0 |
| 6 | r2 = 1 |
| 7 | end_if |
| 8 | r3 = r1 + r2 |

Figure 3:
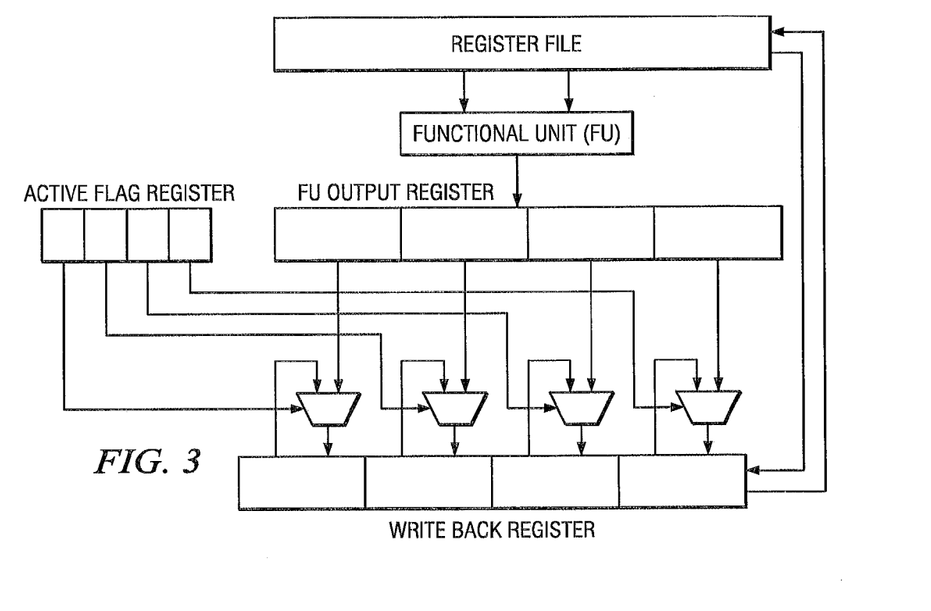
FIG. 3 illustrates data path modifications to a prior art Micro-SIMD architecture that are needed to support execution of single program multiple data (SPMD) programs.

FIG. 3 illustrates the logic that must be added to the data path of the PEs in order to prevent this problem from occurring. The disadvantages of this solution are represented by the additional area required by the register to store the previous content of the register, the logic of selective write (muxes), and an extra read port in the register file. Moreover, due to the additional read port, the register-file access time increases, and possibly exceeds the cycle time of the clock. The drawbacks mentioned above apply to every functional unit of the PEs. For example, with N functional units (FUs), N additional read ports (3N in total) are necessary, resulting in a total area overhead that is N times what is described above.

An alternative solution involves renaming the registers within the "else" branch and subsequently merging them into the original ones (i.e., those referred to in the "then" branch). In this technique the destination registers are always written in full, and that is in all of their subwords, but only some of the subwords actually contain valid data. The PEs that are active in the "then" branch provide a subset of the valid words of the destination register, and the PEs that are active in the "else" branch provide the remaining subwords. Because the destination registers in the "else" part are renamed, there is no overlapping of the data that was previously written during the "then" branch.

Outside of the "if" statement (i.e., after the corresponding "end_if" instruction is encountered), the renamed registers must be merged into the original registers. This merging operation could be done by having the compiler insert, after the "else" branch, some "merge" instructions, one for each register that has been renamed. The "merge" operation has three operands, the first two being the original and renamed registers respectively, and the third being the value of the active flag register as it was at the beginning of the "else" branch. The result of the "merge" operation is a full word whose subwords are taken from either the first or the second operand depending on the value of the active flag register.

In particular, if the "n-th" bit of the active flag register is one ("1") then the "n-th" subword of the result of the "merge" operation is the "n-th" subword of the second (renamed) register, otherwise it is the "n-th" subword of the first register. The cost associated with this solution is in terms of both the additional registers needed to support the renaming as well as the additional cycles needed to carry out the "merge" instructions. The higher numbers of registers needed implies both a larger silicon area and possibly a longer access time, which in turn possibly leads to a longer cycle time.

It is therefore seen that the two prior art techniques to support SPMD execution on a Micro-SIMD machine suffer from higher area cost and possibly poorer performance. To correctly manage the write-back stage into the register file after the execution of an instruction, two techniques have been described. The disadvantages of each of these two techniques are summarized in TABLE TWO.

TABLE TWO

| SELECTIVE WRITE-BACK STAGE | REGISTER RENAMING |
| --- | --- |
| Additional Read Port | Greater Number of Cycles |
| Larger Area | Larger Area |
| Longer Cycle Time | Longer Cycle Time |

The impact over the cycle time depends on the properties of the other parts of the data path design. The cycle time has to be longer than the shortest electrical path in the design (the critical path). To avoid a cycle time penalization, one prior art technique involves splitting the critical path in two parts and pipelining it. This technique leads to superpipelined architectures. In this way the critical path is moved to another electrical path in the design that hopefully is much shorter than the previous path. The disadvantages of pipelining techniques include more difficult control and larger areas, so that the cost/benefits of this technique have to be traded off in the context of the entire design. Possibly global optimization considerations would favor an increase of cycle time.

Simultaneous Multi-threading (SMT) is a microprocessor design that combines hardware multi-threading with superscalar processing technology to allow multiple threads to issue instructions each cycle. Supporting SMT in a SPMD execution mode means that each slot of the instruction issue can be occupied by instructions belonging to different threads. The SMT paradigm does not impose any restrictions as far as which slots a particular thread is allowed to occupy. In general any thread can occupy any slot, even though methods for preventing thread starvation and guaranteeing thread balance are required. Therefore, although these methods will try to avoid that a single thread will systematically take hold of all the instruction slots, it is possible that this situation will occasionally occur. Moreover, the same thread can be assigned in different cycles to different slots.

Figure 4:
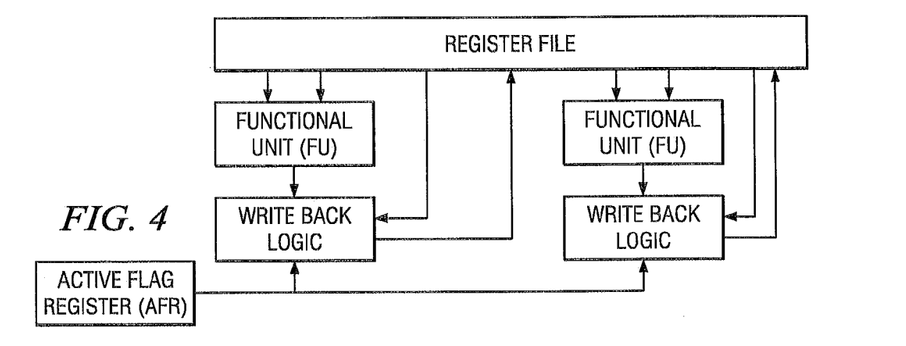
FIG. 4 illustrates data path modifications to a prior art Micro-SIMD architecture that are needed to support execution of single program multiple data (SPMD) programs in a simultaneous multi-threading (SMT) environment.
Figure 5:
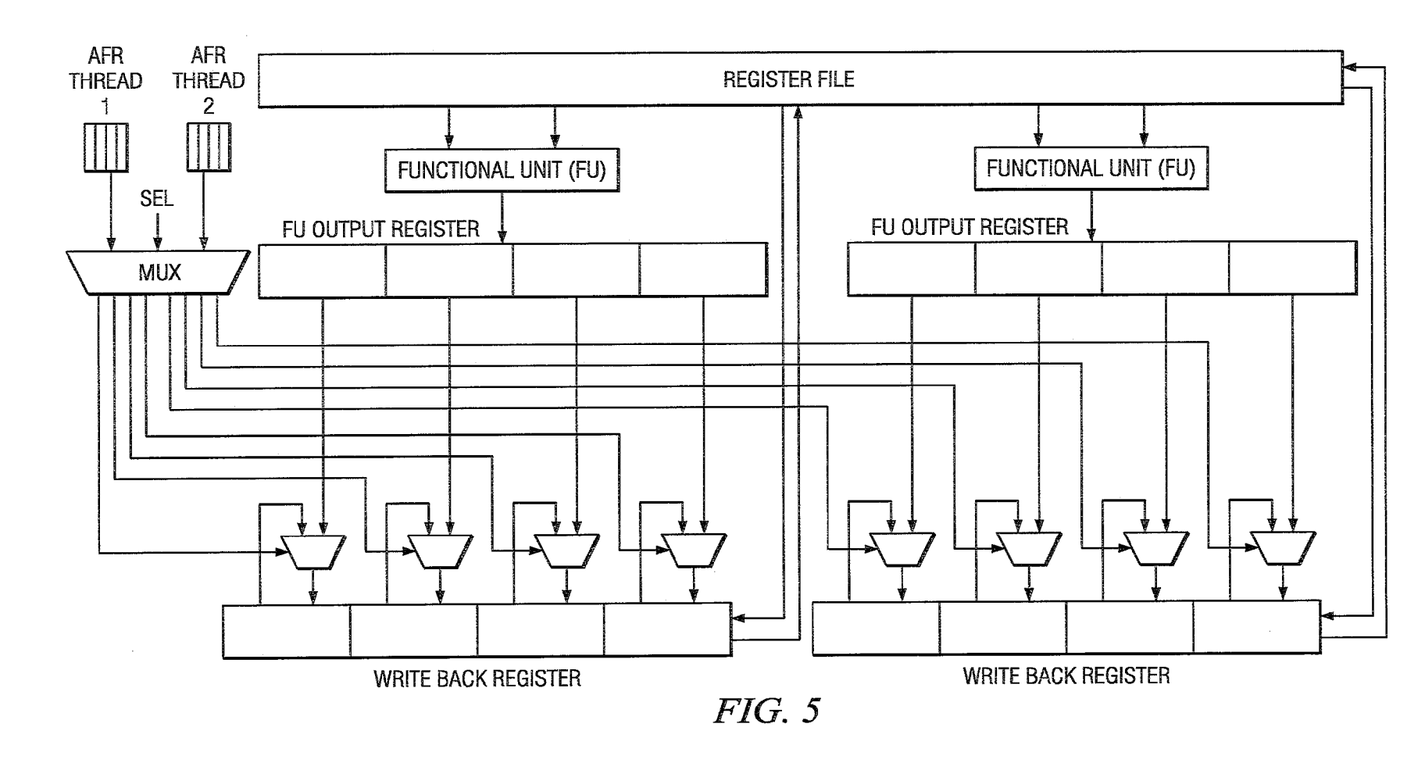
FIG. 5 illustrates a more detailed version of the Micro-SIMD architecture shown in FIG. 4.

In order to overcome the register write-back problem that was previously described, the data path modifications of FIG. 3 need to be further extended as illustrated in FIG. 4 and in FIG. 5. FIG. 4 illustrates data path modifications to a prior art Micro-SIMD architecture that are needed to support execution of single program multiple data (SPMD) programs in a simultaneous multi-threading (SMT) environment. FIG. 5 illustrates a more detailed version of the modified Micro-SIMD architecture shown in FIG. 4.

The modifications include an Active Flag Register (AFR) that is used for each thread that can be supported. A multiplexer selects an Active Flag Register (AFR) for each issue slot and sends it to the Functional Unit (FU) that the slot in question refers to.

The second technique that was previously described (register renaming) lends itself to a simpler extension to SMT support. In this case the only modification involves the employment of multiple Active Flag Registers, one for each thread supported, that will be accessed during the "merge" operations. Despite its simplicity this technique requires a very large number of registers in the register file.

Therefore, there is a need in the art for an improved system and method for efficiently executing single program multiple data (SPMD) programs in a microprocessor.

SUMMARY OF THE INVENTION

To address the deficiencies of the prior art, it is a primary object of the present invention to provide an improved system and method for efficiently executing single program multiple data (SPMD) programs in a microprocessor. The present invention provides a solution to the problems and inefficiencies associated with executing SPMD programs on SIMD machines.

The present invention comprises a job buffer and a micro single instruction multiple data (SIMD) unit within a microprocessor. An output of the job buffer is coupled to an input of the micro SIMD unit. The job buffer dynamically allocates tasks to the micro SIMD unit. The micro SIMD unit sends job status information back to the job buffer to enable the job buffer to efficiently allocate the tasks. The SPMD programs executed by the system and method of the present invention each comprise a plurality of input data streams having moderate diversification of control flows. The system executes each SPMD program once for each input data stream of said plurality of input data streams.

It is an object of the present invention to provide a system and method that generates an instruction stream for each input data stream of a plurality of input data streams.

It is also an object of the present invention to provide a system and method that executes a plurality of SPMD programs wherein each SPMD program of the plurality of SPMD programs is executed on a number of input data streams.

It is another object of the present invention to provide a job buffer in a microprocessor that dynamically allocates tasks to a micro SIMD unit by dynamically bundling jobs to be executed based on a control flow equivalence of the jobs.

It is yet another object of the present invention to provide a system and method that performs job clustering to form a job bundle in which each job in the job bundle has an equivalent control flow.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the Detailed Description of the Invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

The figures and the various embodiments used to describe the principles of the present invention in this patent document are by way of illustration only and should not be construed in any way to limit the scope of the invention. Those skilled in the art will understand that the principles of the present invention may be implemented for any suitably arranged microprocessor.

In order to more clearly describe the structure and operation of the present invention, a detailed definition of certain terms will be first be given. These defined terms will be used throughout the remainder of this patent document.

Basic Definitions. (1) "Job": A job is a combination of a program and an input data-set. The same program may be instantiated with a number of different input data-sets, thus generating different jobs. Throughout this patent document it will be assumed that the execution of jobs generates asynchronous processes, wherein no inter-job synchronization is required. Jobs are indicated with the notation $j_l^{(P)}$ where the superscript letter "P" is the associated program of the job and the subscript letter "l" refers to a given enumeration of the input data-sets of the program P.

Figure 6:
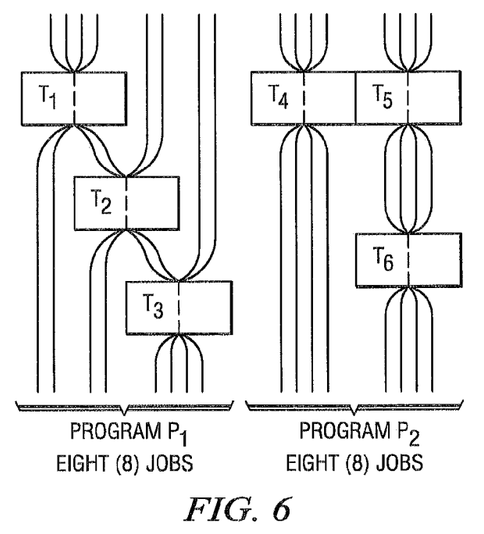
FIG. 6 illustrates an exemplary interaction of jobs, job instruction streams, and tasks in accordance with the principles of the present invention.

(2) "Job Instruction Stream": A job instruction stream is a sequence of instructions executed during a job execution. By way of example, eight (8) jobs (vertical lines) are illustrated in FIG. 6 for both of the programs $P_1$ and $P_2$. Job instruction streams may differ even for jobs with the same associated program due to data-dependent control flow differences induced by their different input data-sets:

$$\forall P, (l_1 \neq l_2) \Leftrightarrow j_{l_1}^{(P)} = j_{l_2}^{(P)}$$

Figure 7:
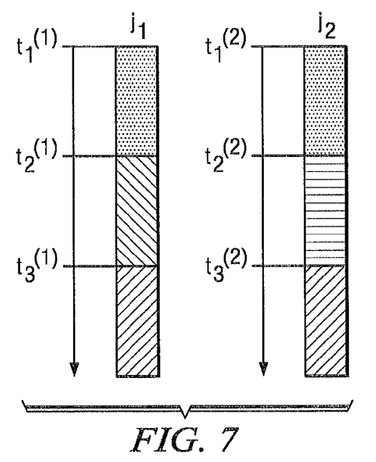
FIG. 7 illustrates a first figure used to describe a principle of job equivalence.
Figure 8:
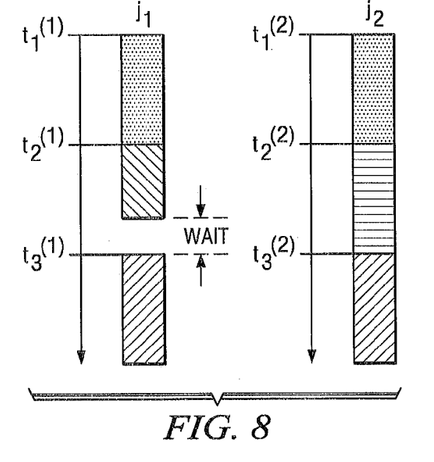
FIG. 8 illustrates a second figure used to describe a principle of job equivalence.

(3) "Job Equivalence": Given two jobs associated with the same program, the two jobs may reveal identical portions of their instruction streams (i.e., identical subsequences of their sequences of PC values). In FIG. 7 the jobs $j_1$ and $j_2$ have two of these identical substreams, graphically represented by means of the same number within each substream. When executing the two jobs, the beginning of each substream is annotated with the time stamps $t_1^{(1)}, t_2^{(1)}, t_3^{(1)}$ and $t_1^{(2)}, t_2^{(2)}, t_3^{(2)}$ respectively for the jobs $j_1$ and $j_2$. Two jobs are said to be equivalent if they are beginning the execution of an identical substream at the same time. For example, FIG. 7 illustrates jobs that have two opportunities to be equivalent: when executing the first substream if $t_1^{(1)} = t_1^{(2)}$ and when executing the third substream if $t_3^{(1)} = t_3^{(2)}$. Note that if the first job completes the execution of the second substream before $j_2$, it still has the opportunity to regain synchronization with $j_2$ in inserting a required waiting period (as illustrated in FIG. 8). By doing so, the jobs $j_1$ and $j_2$ are again equivalent at time $t_3 = t_3^{(1)} = t_3^{(2)}$.

(4) "Job Bundle": A job bundle, formed at a given time "t", is a set of jobs that are equivalent at time "t".

(5) "Job Cluster": A job cluster (or simply a "cluster") is the set of all the jobs equivalent to each other. In general at any given time there exists a collection of distinct clusters.

(6) "Task": A task for a Micro-SIMD unit of size "m" is a job bundle of "m" or fewer jobs allocated to that unit for the execution.

(7) "Task Instruction Stream": Because the jobs bundled in a task are, by definition, equivalent then the instruction stream of the jobs can be collectively referred to a single task instruction stream. Task instruction streams are graphically illustrated in FIG. 6 by means of lines within the tasks. The example shown in FIG. 6 illustrates six (6) tasks. Each task comprises four (4) jobs. A task terminates as soon as the task instruction stream encounters a certain pre-defined instruction that is referred to as a "code-stop."

"Equivalent Tasks": Tasks are said to be equivalent if they have the same task instruction stream. Equivalent tasks respectively bundle disjoint subsets of the same job cluster, and they can be allocated to the Micro-SIMD unit either sequentially or (asynchronously) in parallel. Because instructions are independently fetched from task instruction streams even when they are equivalent, the number of task instruction streams simultaneously alive always corresponds to the number of tasks being concurrently executed.

(9) "Code-Stop": A code-stop is a pre-defined (program dependent) Program Counter (PC) value that causes a task to terminate. A code-stop causes a job to change its state from "active" to "hold." A code-stop is represented by a mark in the program code, or, equivalently, by a value of the Program Counter (PC).

(10) "Job Processing Status": A job processing status (or simply "status") is consists of (1) the identity of the associated program, (2) the value of the Program Counter (PC), and (3) a loop-counter list. The loop-counter list is a list of the current loop-iteration count for each of the loops that embody the instruction that the Program Counter (PC) points to. The loop-counter list is empty if the instruction is not within the scope of any loops.

Figure 9:
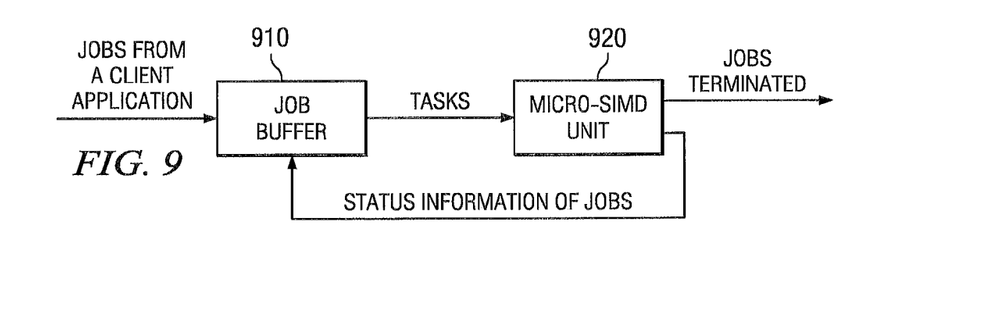
FIG. 9 illustrates a top level diagram showing a job buffer and a Micro-SIMD unit in accordance with the principles of the present invention.

FIG. 9 illustrates a top level diagram of an advantageous embodiment of the present invention. The present invention comprises job buffer 910 coupled to a Micro-SIMD unit 920. Job buffer 910 is placed in front of the Micro-SIMD unit 920 and supports the dynamic allocation of tasks to the Micro-SIMD unit 920. Micro-SIMD unit 920 also provides status information for the jobs in Micro-Unit 920 to job buffer 910.

The execution of tasks is treated like threads in a multi-threading environment. This means that when tasks are being executed according to the Simultaneous Multi Threading (SMT) paradigm, task instruction streams are combined in a joint "SMT bundle stream" to maximally exploit the Instruction Level Parallelism (ILP) present in the instruction streams of the individual tasks. In this way the expected number of instructions that can be issued per cycle increases.

A detailed discussion of the advantages of SMT are beyond the scope of the description of the present invention. The application of SMT to the tasks generated as described above is a unique and novel technique.

Figure 10:
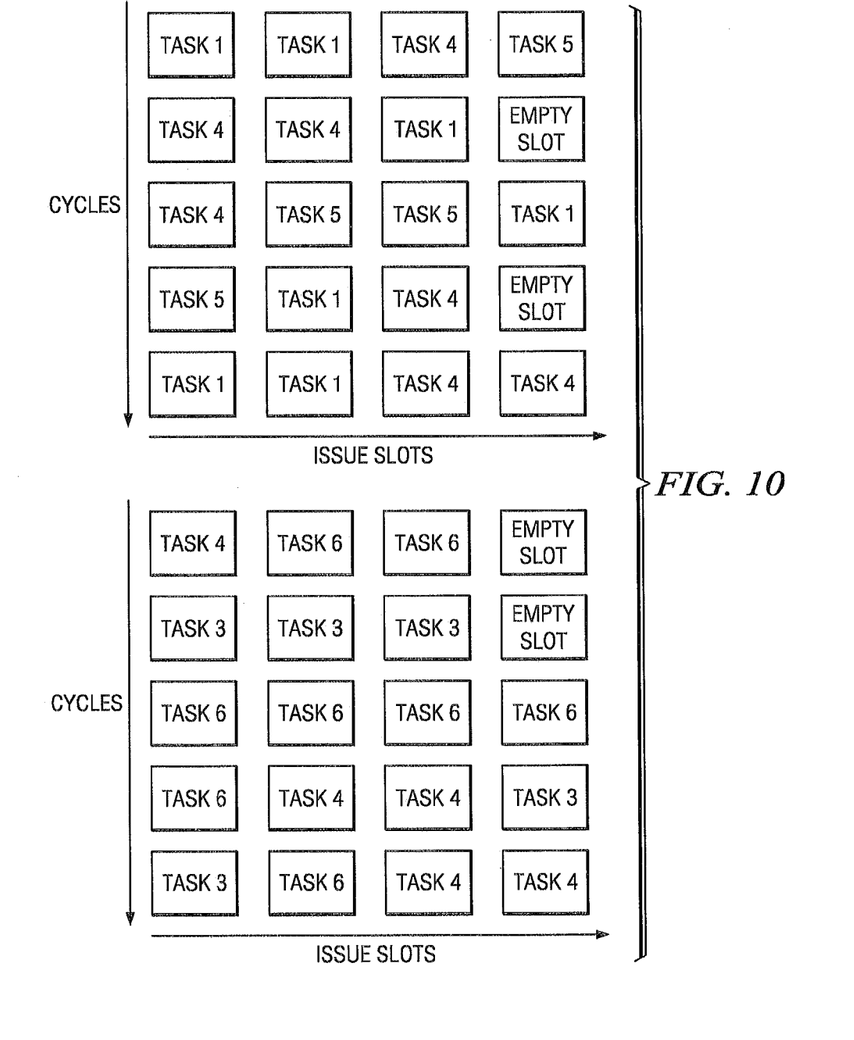
FIG. 10 illustrates two examples of simultaneous multi-threading (SMT) instruction bundles for the exemplary job instruction streams shown in FIG. 6.

A SIMD machine comprises an Array Control Unit (ACU) and an array of Processing Elements (PEs). The ACU dispatches to the array of PEs "SMT instruction bundles" by compiling instructions from independent task instruction streams. In FIG. 10 two examples of SMT bundle streams are shown. The set of active threads are respectively the Tasks 1, 4, 5 and the Tasks 3, 4, 6. Keeping the same task enumeration of FIG. 6, notice that:

(1) Tasks belonging to different programs may be simultaneously active.

(2) Two (or more) equivalent tasks can be simultaneously active (e.g., task 4 and task 5).

(3) Tasks whose jobs have already been executed for a different number of cycles can be simultaneously active (e.g., Task 4 and Task 6).

Figure 11:
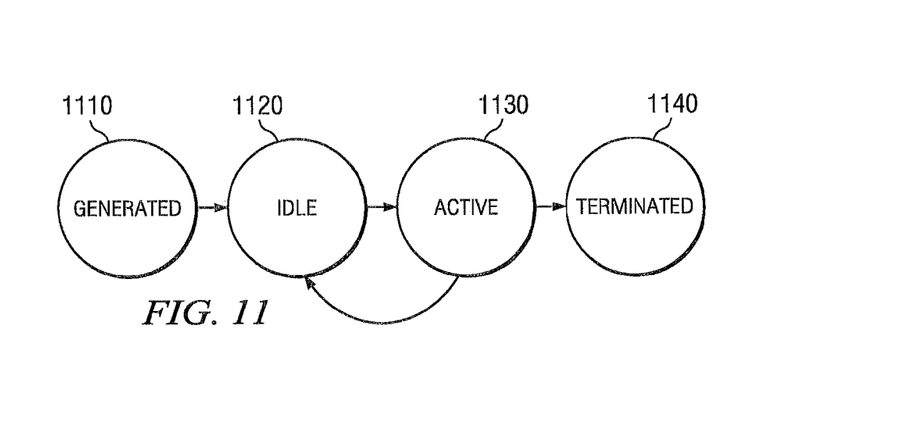
FIG. 11 illustrates an exemplary job state diagram in accordance with the principles of the present invention.

States of Job Execution. FIG. 11 illustrates a state diagram showing how the execution of a job may be described in terms of states and transitions between states. Each state represents a different physical memory where the context of the job resides, so that it mirrors a context-switch subsystem (which will be described later). The transitions between states represent the operations associated with the moving of part of the entire job context in order to bring it closer to the functional units.

A job is assumed to be "generated" by a "client application," which saves its initial context within an off-chip memory. At this point the jobs lie outside of the processor, which has no knowledge of their existence. The job is in a "generated" state 1110.

Subsequently a job is admitted into the system. That is, its context is brought into the on-chip memory where it will always reside thereafter. At this point the job is in an "idle" state 1120 and can be scheduled for execution. It is assumed that the number of jobs in the "idle" state 1120 is greater than the number of jobs that can be simultaneously executed. For this reason, at any time only a portion of the "idle" jobs are being executed and the others remain in a "wait" state (which will be described later), waiting for a slice of execution.

When the jobs are being executed they become "active" and their context (or part of the context) resides in the on-chip memory storage that is closest to the functional units (register file). The job in then in an "active" state 1130. Jobs that have been terminated are placed in a "terminated" state 1140.

Figure 12A:
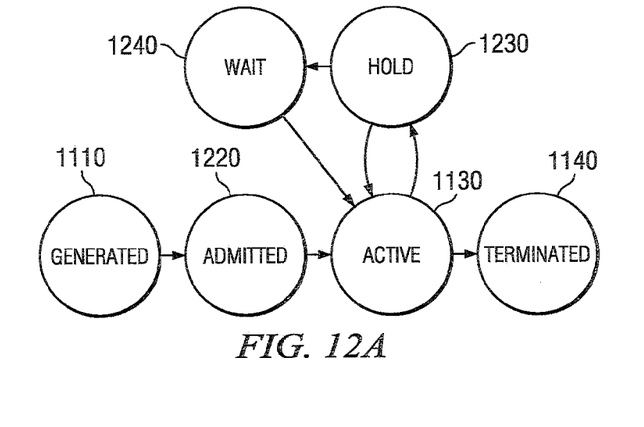
FIG. 12A illustrates a modified version of the exemplary job state diagram shown in FIG. 11.

FIG. 12A illustrates a refinement of the "idle" state 1120 of FIG. 11. The first time the jobs are brought into the system they are said to be in an "admitted" state 1220. After having been executed for a slice of execution (in "active" state 1130), the jobs are temporarily kept on hold in a "hold" state 1230. In the "hold" state 1230 the jobs release the hardware resources that they were using and compete with the others in order to regain their possession. Because all of the "idle" jobs compete for the same execution slots, a job can either succeed or fail in obtaining a slot. Therefore, a job in a "hold" state 1230 can either be rescheduled for another slice and become "active" again (in "active" state 1130) or enter into a "wait" state 1240. New opportunities for the jobs in the "admitted" states 1220 and in the "wait" states 1240 to become active are contingent on the termination of a task. At that point the jobs that make up the task just terminated enter a "hold" state 1230, release the executions slots, and those that were in an "admitted" state 1220 and in a "wait" state 1240 can compete for the slots just released.

Figure 12B:
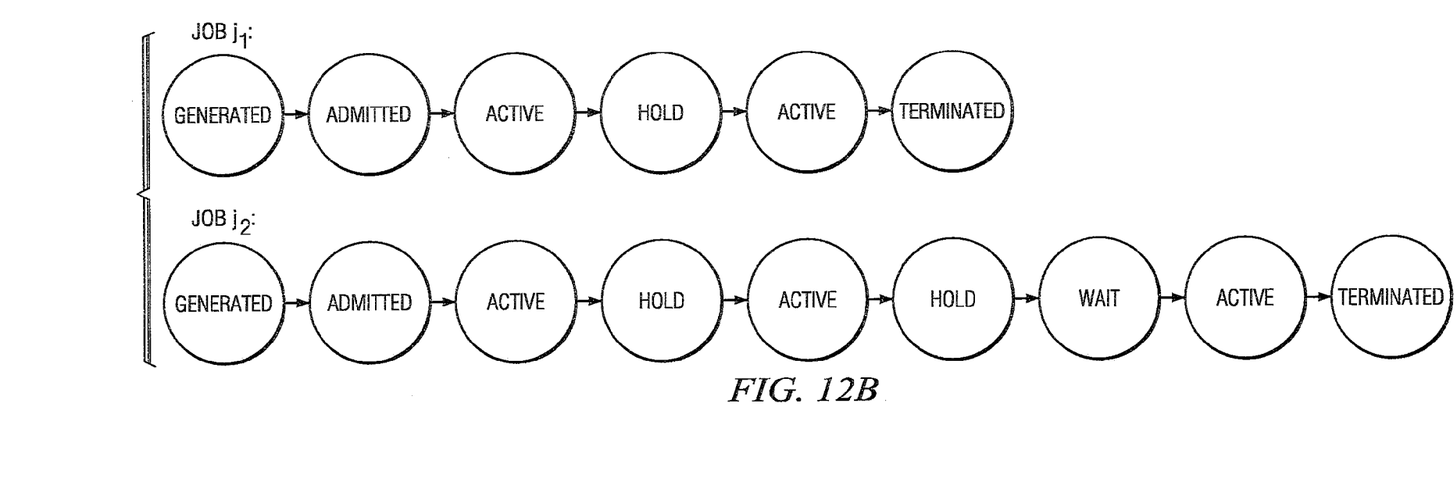
FIG. 12B illustrates exemplary job state paths for two exemplary jobs that go through the job state diagram shown in FIG. 12B.

FIG. 12B illustrates two examples of state transactions for the execution of two jobs. The job $j_1$ needs only two slices of execution, while the job $j_2$ need three slices of execution. Finally a job terminates its execution and enters into a "terminated" state and no longer competes for the hardware resources. Any time that a job terminates, a new job is admitted into the system through fetching its initial context from the off-chip memory storage.

Code-Stops. The concept of code-stops and how code-stops intervene in the formation of tasks will now be discussed. A code-stop is any one of a number of predefined (program dependent) Program Counter (PC) values that cause a task to terminate. Equivalently, code-stops cause jobs to change their state from "active" to "hold." A code-stop is represented by a mark in the program code, or, equivalently, by a value of the Program Counter (PC). In the pseudo-code examples set forth below, double-line arrows mark the instructions where a code-stop is placed. When executing a task the Program Counter (PC) is shared by all the PEs in the Micro-SIMD array 920. As soon as the Program Counter (PC) matches the value of a code-stop, the task is forced to terminate after the completion of the current instruction and the result of the code-stop is used to independently update the PC for each PE. The possible values that the locally updated PCs might have as a result of the independent PC updating are marked by single-line arrows in the following pseudo-code examples. This means that a code-stop has been encountered, the lockstep mode of execution is temporarily abandoned, in that each PE is allowed to update its own copy of the PC as if it were executing in scalar mode.

TABLE THREE illustrates a pseudo-code example in which a code-stop is placed at a conditional "if" statement.

TABLE THREE

| | | |
|---|---|---|
| 1 | | expr_1 |
| 2 | | expr_2 |
| 3 | | expr_s |
| 4 | ⇒ | if (a==0) then |
| 5 | → | then_expr_1 |
| 6 | | ... |
| 7 | | then_expr_n |
| 8 | | else |
| 9 | → | else_expr_1 |
| 10 | | ... |
| 11 | | else_expr_m |
| 12 | | end_if |

The variable "a" is assumed to take on independent values within each job so that when a task reaches the code-stop when the Program Counter (PC) equals four (4), each job may possibly obtain different results when evaluating the expression (a==0) and based on the (local) result will update their Program Counters (PCs) to either five (5) or nine (9).

TABLE FOUR illustrates a pseudo-code example in which there are two nested "if" statements. Each of them induces the placement of a code-stop, one at PC equals two (2) and one at PC equals four (4). The presence of nested control flow statements, like that shown in the pseudo-code of Table Four, raises a problem of job status proliferation which will be addressed later.

TABLE FOUR

| | | |
|---|---|---|
| 1 | | expr_list |
| 2 | ⇒ | if (a==0) then |
| 3 | → | then_expr_list_1 |
| 4 | ⇒ | if (b==0) then |
| 5 | → | then_expr_list_2 |
| 6 | | else |
| 7 | → | else_expr_list_2 |
| 8 | | end_if |
| 9 | | else |
| 10 | → | else_expr_list |
| 11 | | end_if |

TABLE FIVE illustrates a pseudo-code example in which a code-stop is placed in correspondence to a "for-loop" statement. The code-stop is placed at the end of the loop body, (PC=4), where the condition (n==a) is evaluated and the Program Counter (PC) is brought backward to (PC=3) or brought forward to (PC=5), accordingly.

TABLE FIVE

| | | |
|---|---|---|
| 1 | | expr_list |
| 2 | → | for (n=1 to a) |
| 3 | | for_loop_expr_list |
| 4 | ⇒ | end_for |
| 5 | → | ... |

As has been previously mentioned, code-stops force the termination of the task at points where the control path of the job might fork. This prevents any PE-array underutilization from occurring. On the other hand, a critical aspect of this mechanism is the number of instructions that a task embraces (i.e., the number of instructions between two consecutive code-stops). In fact, due to the overhead of control operations involved in the allocation of new tasks, the longer the task duration, the better the overhead can be hidden.

The average task duration may be increased by a technique that can be carried out prior to placing the code-stops in the program. This technique is referred to as "code-stop reduction." Code-stop reduction attempts to reduce the number of code-stops that need to be placed in the program by excluding from the code-stop placement those control flow statements that can be turned into simple "select" instructions.

The pseudo-code example in TABLE SIX illustrates this principle. Whenever the two branches of an "if" conditional statement have the sole purpose of calculating the values of subexpressions of a bigger expression (TABLE SIX (a)), both the sets of subexpressions can be calculated and then the correct set selected according to the value of the Boolean expression in the conditional. In TABLE SIX (b) the code of TABLE SIX (a) is transformed to explicitly calculate the subexpressions in both of the branches. In TABLE SIX (c) the "select" instructions are inserted. The semantic of the "b=select (p,b1,b2)" instruction is as follows: If "p" is one (1) then assign "b1" to "b", else assign "b2" to "b".

If the two branches are asymmetric in that some variables are set in only one of the branches and are alive outside the scope of the conditional statement, then this expression should be guarded and executed by using predictive execution techniques. The code-stop reduction trades off possible additional computation for less frequent task allocations, so it must be selectively applied to the control flow statements of the job programs depending on the characteristics on their bodies.

TABLE SIX

| | a | b | c |
|---|---|---|---|
| 1 | ⇒ if (a==0) then | b1=expr_1 | b1=expr_1 |
| 2 | → b=expr_1 | c1=expr_2 | c1=expr_2 |
| 3 | c=expr_2 | b2=expr_3 | b2=expr_3 |
| 4 | else | C2=expr_4 | c2=expr_4 |
| 5 | → b=expr_3 | ⇒ if (a==0) then | p= (a==0) |
| 6 | c=expr_4 | → b=b1 | b=select(p,b1,b2) |
| 7 | end_if | c=c1 | c=select(p,c1,c2) |
| 8 | x=b+c | else | x=b+c |
| 9 | | → b=b2 | |
| 10 | | c=c2 | |
| 11 | | end_if | |
| 12 | | x=b+c | |

Given a program P, the set C of code-stops in the program P will be denoted by the expression C(P).

$$C(P) = \{c_1, c_2, \ldots, c_{N_P}\}$$

where $N_P$ is the number of code-stops in the program P.

Job Processing Status. The attributes of the job processing status are used to perform the equivalence test for two or more jobs. A given status is said to be "alive" if there exists at least one job, not yet terminated, that holds that status.

Because the Program Counter (PC) gets sequentially updated between two consecutive code-stops, the entire control path of a job is fully represented by the sequence of the statuses taken on after the execution of all of the encountered code stops. The notation c|s indicates that the status "s" is taken on immediately after executing the code stop "c". The execution of a job can then be represented by:

$$j_l^{(P)} = (s_{l,1}, c_{l,1} | s_{l,2}, c_{l,2} | s_{l,3}, \ldots, c_{l,L_l-1} | s_{l,L_l})$$

where $L_l$ is the number of statuses visited by the job $j_l^{(P)}$ and $\forall n, c_{l,n} \in C(P)$.

The group of instructions between two code-stops (including the last instruction) is called a "basic block." While the execution of a job progresses, the job is indicated by the sequence of the statuses that are yet to be visited. For example, a job that has already executed the first "n minus one" (n−1) basic blocks is indicates with the expression:

$$j_l^{(n)} = (s_{l,n}, c_{l,n} | s_{l,n+1}, c_{l,n+1} | s_{l,n+2}, \ldots, c_{l,L_l-1} | s_{l,L_l})$$

The status of the job (i.e., job status) rules the job clustering process and, consequently, as will be more fully described, the instantiation of the tasks.

Job Clustering. The possible differentiation of the results of control flow statements associated with each Processing Element (PE) is the cause of poor SIMD array utilization. If the allocation of jobs to the PE array were changed in such a way as to bundle jobs that possess the same result, it would then be possible to virtually obtain one hundred percent (100%) array utilization.

The central concept of the present invention is a mechanism to "dynamically" bundle the jobs to be executed on the basis of their control flow equivalence. The overall result is the allocation to the Micro-SIMD unit 920 of "ideal" tasks. That is, pieces of computations that, sharing the same control flow, are immune to the problem of SIMD array underutilization caused by control flow divergence among the executing jobs. In order to guarantee that the jobs being jointly executed on the Micro-SIMD unit 920 always share the same control flow, the operation of task allocation must be performed before any control flow divergence can take place, or, in other words, when a code-stop is encountered.

The operation of job clustering is instrumental to the formation of job bundles with equivalent control flows. It takes place on a set of J jobs, representing the totality of the jobs in "admitted" states 1220, and collectively described by a data structure referred to as the "job buffer" 910.

Figure 13:
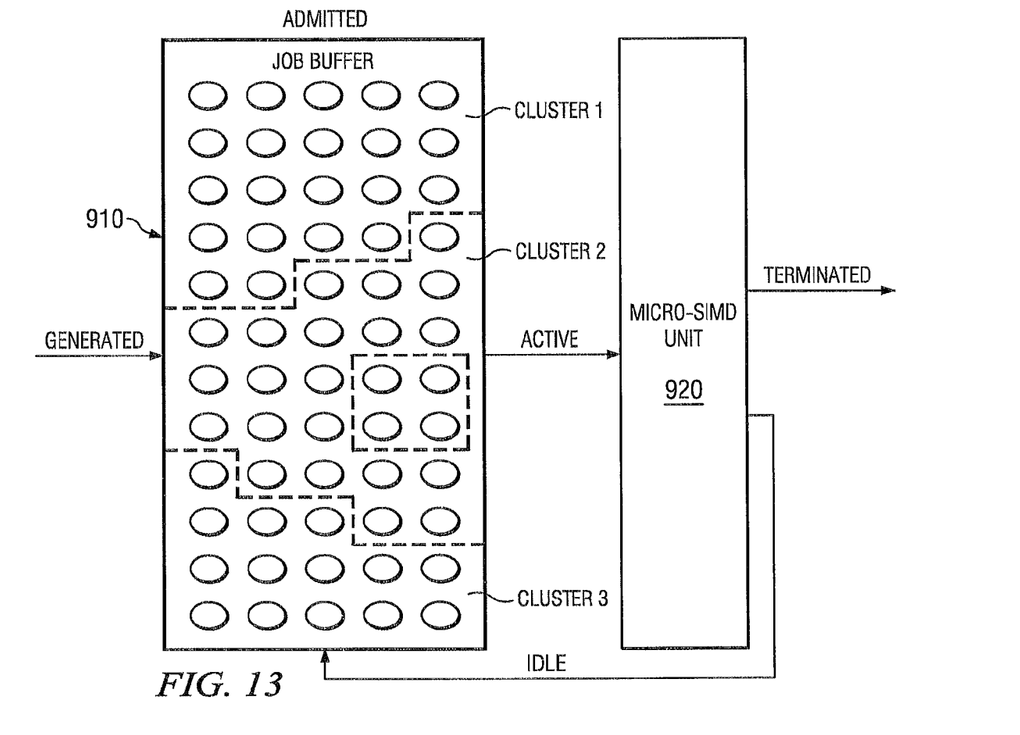
FIG. 13 illustrates how tasks are allocated to the Micro-SIMD unit of the present invention by selecting jobs that belong to the same cluster.

From the job buffer 910, jobs are selected for the formation of tasks to be dispatched to the Micro-SIMD unit 920. FIG. 13 illustrates this concept. The tasks being executed release the Micro-SIMD unit 920 (and the participating jobs enter the "hold" state 1230) at the next code-stop, thereby allowing an update of the clustering structure of the job buffer 910. The preemptive nature of task execution is the key to continuously assure that at any time the best-fit tasks take hold of the Micro-SIMD unit 920.

Figure 14:
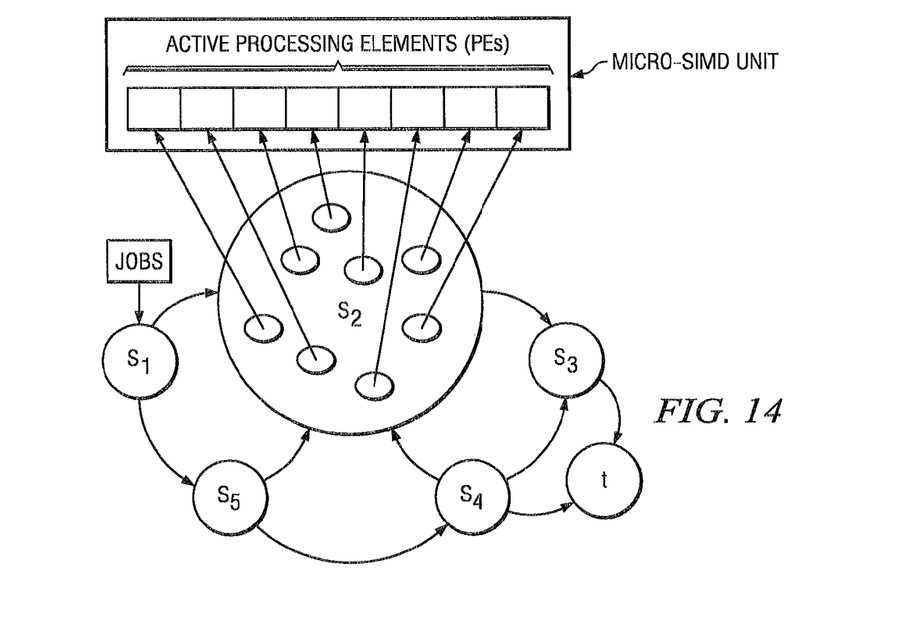
FIG. 14 illustrates how jobs are dynamically allocated to the processing elements (PEs) of the Micro-SIMD unit of the present invention.

FIG. 14 illustrates a graph in which the nodes represent job statuses and the arcs represent possible status transitions. Each job exhibits its own path of status transitions, so that in a MIMD execution scenario (where the control flows of the jobs are independently handled) it is not possible to predict "a priori" in which node each job is located at a given time. Different jobs can actually scatter over all of the nodes. Job clustering assures that only jobs in the same status (node) are allocated to the Micro-SIMD unit 920.

In addition to overcoming the inefficiencies generated by a poor array utilization, a dynamic job clustering and allocation also allows a Micro-SIMD unit 920 to easily support SMT. In fact, as previously explained, supporting SMT in a system where a thread is the execution of an SPMD program is made difficult by the fact that a given PE can be, independently with respect to the other PEs and simultaneously, "active" for some threads and "inactive" for others. With the technique of job clustering this problem disappears as each thread will be "active" by construction on each PE.

The cost in terms of additional silicon area that the implementation of these mechanisms require is tolerable. As far as the benefits are concerned, the benefits depend on the particular characteristics of the applications. As anticipated in the introduction, for Multi-SPMD problems this approach will produce a level of performance far higher than what would otherwise be attainable with other known approaches. For problems not belonging to the Multi-SPMD category other architectures are preferable to the present one.

Beyond the simplistic classification of problems among the known computing paradigms, often applications show heterogeneous characteristics, in that different paradigms can be best used to describe different parts of the same application. For this reason, the proposed approach could be used to speed up selected portions of an application, rather than monolithically executing it in its entirety.

Job Admission. The admission of new jobs into the system is contingent on the termination of some of the jobs that were previously in the system. Job admission takes place by updating the content of the job buffer with the data of the new jobs and removing the data corresponding to the terminated jobs.

An ideal job admission policy has two basic requirements. First, whenever requested, the job admission policy instantaneously provides the required number of new jobs. Second, the job admission policy provides jobs that increase the likelihood of generating ideal tasks thereafter.

With respect to the first requirement, because new jobs are requested upon the termination of the old jobs, the worst case condition occurs when all of the jobs in all of the tasks currently being executed terminate. Even though the simultaneous termination of jobs belonging to distinct tasks is possible, in one advantageous embodiment of the invention there is a more relaxed requirement of supporting the admission of a number of new jobs equal to the size of the Micro-SIMD unit 920.

With respect to the second requirement, the probability of generating ideal tasks changes, as a consequence of admitting new jobs, depending upon how close are the control flows of the new jobs both respect to each other (leading to the immediate generation of ideal tasks) and subsequently with respect to the jobs whose execution is already on-going. In order to meet the second requirement, it is assumed that the client application sends to the job buffer jobs prioritizing those that are associated with the same program and, where possible, adopting application-dependent inter-jobs control path metrics.

Job Buffer. The job buffer 910 is a memory that contains job status information used to select the jobs that can be bundled in a task whenever a new task has to be instantiated.

The number of jobs that the job buffer 910 contains is critical to the overall performance of the invention. A larger buffer provides better opportunities to find ideal tasks for the Micro-SIMD unit 920. On the other hand, a larger buffer costs more in terms of silicon area and the time to perform the job clustering operation. The time grows as the order of $\log(J)$ (i.e., $O(\log(J))$, where J is the number of jobs maintained in the job buffer 910. The optimal job buffer size depends on the characteristics of the typical computing workload conditions that are being targeted. In one advantageous embodiment of the invention the value of J is four (4) times the size of the Micro-SIMD unit 920. That is, $$J = 4 \cdot m$$

where "m" is the size of the Micro-SIMD unit 920.

In order to guarantee a fast job clustering operation the job buffer 910 is structured is such a way as to mirror the structure of the job clusters. In this way, the sizes of the job clusters are readily available whenever a job bundle selection operation is required. This choice calls for a continuous maintenance of the consistency between the structure of the job buffer 910 and the job clusters.

Job Clustering. Job clustering is the operation of grouping "idle" jobs on the basis of their processing status. Let I be the set of the "idle" jobs in the job buffer:

$$I = \{j : \text{state}(j) = \text{idle}\}$$

Let F be an equivalence relation on I such that:

$$\forall j_1, j_2 \in I, (j_1, j_2) \in F \Leftrightarrow \text{status}(j_1) = \text{status}(j_2)$$

where "status(j)" indicates the status of the job "j".

Let S be the set of all the "alive" statuses in I:

$$S = \{s \mid \exists j \in I : \text{status}(j) = s\}$$

The set of all the jobs with the same status s is the class of equivalence $[s]_F$:

$$[s]_F = \{j \mid \text{status}(j) = s\}$$

The clustering operation amounts to partitioning the "idle" jobs in the equivalence classes of F. It is then defined as follows:

$$\text{job\_clustering}(I) = \{[s]_F \mid s \in S\}$$

Therefore the job clustering operation partitions the set I in |S| subsets, where |S| denotes the size of the set S.

The number of jobs with the same status s is indicated with e(s):

$$e(s) = |[s]_F|$$

Figure 15:
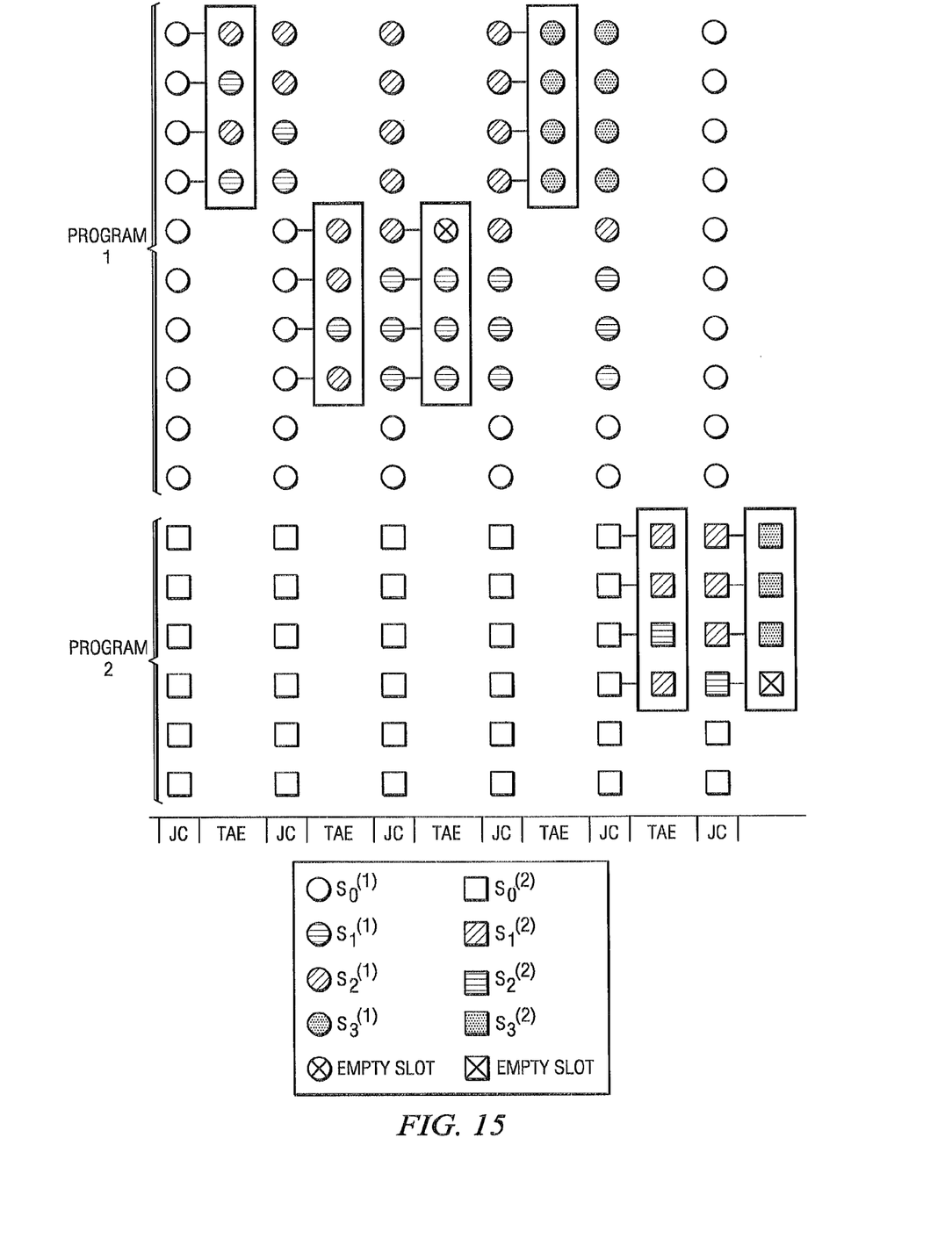
FIG. 15 illustrates an example of three job reordering-execution stages in accordance with the principles of the present invention.

FIG. 15 illustrates a simplified example of system evolution. At the bottom of FIG. 15 the letters JC denote "job clustering" and the letters TAE denote "task allocation and execution." In the illustrated example, the job buffer 910 has a size of sixteen (16) and the Micro-SIMD unit 920 has a size of four (4). Because, for the sake of simplicity, multi-threading is not considered in this example, the set of "idle" jobs I consists of either twelve (12) jobs (when a task is being executed) or sixteen (16) jobs (between a task termination and a new task allocation). The "job_clustering" transformation of the set $I_n$ immediately before the "n-th" stage of task generation, is then:

$$\text{job\_clustering}(I_1) = \{[s_0]_1^{(P2)}, [s_0]_1^{(P2)}\}$$

$$\text{job\_clustering}(I_2) = \{[s_0]_2^{(P1)}, [s_1]_2^{(P1)}, [s_2]_2^{(P1)}, [s_0]_2^{(P2)}\}$$

$$\text{job\_clustering}(I_3) = \{[s_0]_3^{(P1)}, [s_1]_3^{(P1)}, [s_2]_3^{(P1)}, [s_0]_3^{(P2)}\}$$

where $[s_j]_n^{(P)} \subset I_n$ represents the class of equivalence of the "j-th" status (based on a given enumeration of statuses) of the program P at "time n" that corresponds to the set $I_n$.

Note that although the status $s_2^{(1)}$ is "alive" at both "time 2" and "time 3", the two sets $[s_2]_2^{(P1)}$ and $[s_2]_2^{(P1)}$ are different, because in general for any given representative status s the classes of equivalence are different at different times:

$$\forall s, n \neq m, \text{not} \Rightarrow ([s]_n^{(P)} = [s]_m^{(P)})$$

Job Buffer Maintenance. It is seen that the transformation "job_clustering" performs a re-partition of the set of "idle" jobs I whenever there is a change of the collective status information of the "idle" jobs. It is therefore very important to maintain consistency between the content of the job buffer 910 and the actual collective status of the processing of the jobs. To this purpose the events are identified that need to be handled in order to keep job buffer consistency. Based on the possible state transitions of the idle jobs, there are three ways to alter the set I. A specific event is associated with each state transition. Each of the specific events causes a group of jobs to flow in or flow out of the set I.

(1) New Jobs Event. A New Jobs Event occurs when a group of jobs is first admitted in the set I. The group of jobs is in the "admitted" state 1220. This happens in order to replace the jobs that were previously being executed and have terminated.

(2) Job Update Event. A Job Update Event occurs on a "active-hold" transition of a group of jobs. This happens when the jobs that were being executed reach a code-stop and update their respective processing status.

(3) Task Generation Event. A Task Generation Event occurs on an "idle-active" transition of a group of jobs. This happens when a new task is generated, causing the bundled jobs to be activated. The Task Generation Event keeps track of those jobs that are currently being executed so as to prevent the same job from being simultaneously bundled more than once.

Task Generation. A "job bundle" is any collection of jobs with the same status (i.e., equivalent status) that is an element of a set named "bundles." The set "bundles" is defined as:

$$\text{bundles} = \bigcup_{s \in S} P([s]_F)$$

where P indicates the power set operator.

An "m-ary job bundle" is a job bundle with "m" or fewer jobs that is an element of the set:

$$\text{bundles}(m) = \{J \in \text{bundles}: |J| \leq m\}$$

Consequently, bundles≡bundles(∞).

The term bundles(I,m) will be written instead of the term bundles(m) in order to emphasize the dependency from the set I.

A "maximal job bundle" of the set bundles(m) is a job bundle that is not a proper set of any other "m-ary job bundle."

$$\text{bundles}(\tilde{m}) = \{J \in \text{bundles}(m) | \text{not} \exists \hat{J} \in \text{bundles}(m): J \subset \hat{J}\}$$

The operator task_selector selects an element of the set bundles(I,m̃):

$$\text{task\_selector}(\text{bundles}(I,\tilde{m})) \in \text{bundles}(I,\tilde{m})$$

The operation of allocating a task to a Micro-SIMD unit μ is modelled by the operator task_generator:

$$\text{task\_generator}(\mu) = \text{task\_selector}(\text{bundles}(I,\tilde{\mu}' \text{ size}))$$

where μ' size denotes the size of the Micro_SIMD unit μ.

Virtual Processing Element Emulation. In order to maximize the sizes of the job clusters the jobs that have a possibility of reaching the status of the other tasks should be executed first. An "alive" status s is said to be "complete" if it is not reachable by any other job in the job buffer 910. In other words, a status s is complete if the upstream code stop of s (i.e., c|s) cannot be reached by any possible control path of any job in the job buffer 910. This means that the job cluster $[s]_F$ cannot grow any further, so that jobs from this cluster can be immediately executed with no impact on performance.

Based on the considerations set forth above, the operator task_selector should be such that the following proposition is true.

$$\text{task\_selector}(\text{bundles}(I,\tilde{m})) = T^* \Rightarrow \text{status}(T^*) \text{ is complete}$$

The requirement that the task generation meet this condition guarantees that the formation of job clusters always leads to clusters of the largest size, which in turn offers the best opportunities to maximize the occupancy of the Processing Element (PE) array.

This condition (or restraint) corresponds to emulating Virtual Processing Elements (VPE) in that as long as there are jobs left in a cluster, the formulation of new tasks continues to favour those that were temporarily left behind. The execution of the jobs in a cluster is thus perceived as if they were executed jointly on a larger Processing Element (PE) array.

Figure 16:
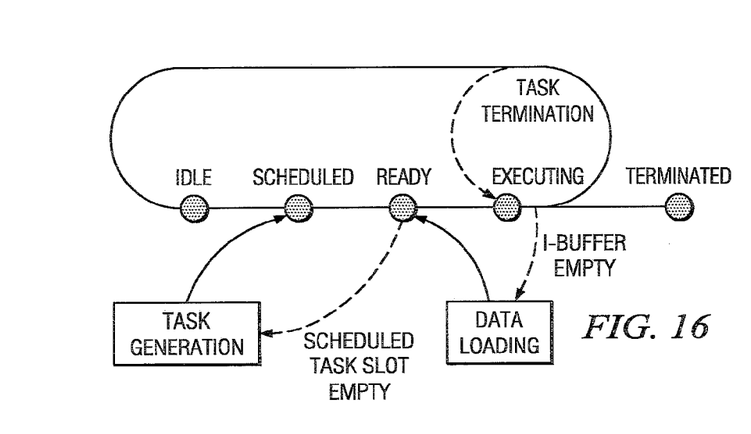
FIG. 16 illustrates an exemplary task state diagram in accordance with the principles of the present invention.

Task States. A description of the states of a task from generation to termination will now be given. The path of a task state transition is illustrated in FIG. 16.

A task is said to be "scheduled" when the task is generated according to the task generation operation that has been previously described.

A task is said to be "ready" when the input dataset of the task is available within the register file. This means that the execution of the task may begin.

A task is said to be "executing" when the control unit of the Micro-SIMD unit 920 adopts it as a thread of execution in a SMT environment.

Each job loops over the idle-scheduled-ready-executing loop for a number of times before terminating. A task exists only between the states "scheduled," "ready," and "executing." The states "idle" and "terminated" relate to job states only. The task states ("scheduled", "ready", and "executing") correspond to the single job state "active", which means that while a job is "active" the task it belongs to can be in either the "scheduled," "ready," or "executing" state. A task is born when it enters the "scheduled" state and terminates either when the participating jobs terminate or when they enter the "idle" state.

To model the conditions that enable the task state transitions, generic "slots" associated with the states are used. A number of slots are initially available to each state. When entering into a state, a task occupies one of such slots, while when exiting the state it frees up one slot. A state transition is then allowed whenever an empty slot in the destination state is available. A dashed line in FIG. 16 illustrates the release of slots that the progress of a task has made available to the other tasks.

For a task to become "scheduled" and "ready", two operations need to take place first. The first operation is the operation of "task generation" (which has been previously explained). The second operation is the operation of "data loading" (which will be subsequently explained). In other words, a task needs to be selected by the task generation procedure for the task to perform the "idle-scheduled" transition, and the task needs to load its input dataset for the task to perform a "scheduled-ready" transition.

The transition "ready-executing" of a task frees up a slot of ready tasks, thus enabling the data loading transition to occur. In turn, as soon as the data loading is activated, a slot of "scheduled" tasks gets freed up thus enabling the task generation transition. This allows an m-ary task to be formed from the set of currently idle jobs. When a task is generated the selected jobs flow out of the set of idle jobs I.

The termination of a task causes two different sets of jobs to be generated. The first set is the set comprising the jobs that have not reached their completion yet. The second set is the set comprising newly admitted jobs that replace those jobs whose execution has just terminated. Both of the two sets of jobs are used to refresh the job buffer content.

Data Loading. When the input dataset of a task is readily available (i.e., stored in the register file) the task itself can start the execution without incurring the time consuming operations of memory reads. Even though the execution can actually start before having the entire input dataset transferred into the register file, because of the particularly large amount of data to read that a Micro-SIMD architecture has to cope with (m times the size of a dataset for a single job for an m-ary task) a mechanism to hide the data loading time is necessary. For this purpose the execution of a task is decoupled from the data loading of the task. A number of "execution slots" and an equal number of "ready-task slots" represent respectively the hardware resources that are collectively associated with the execution phase and the data loading phase of the life of a task.

A task becomes ready for execution when its input dataset is transferred to the register file attached to the Micro-SIMD unit 920 that the task is going to be executed on. Data loading hiding is accomplished by initiating data loading concurrently to the execution of other tasks. In this way, ideally, when a task terminates its execution, the input data for the next task is already located in the register file thereby allowing an uninterrupted instruction flow to the Micro-SIMD unit 920. In other words, the transition "scheduled-ready" of a task needs to complete before the transition "executing-idle" of the previous task. In the case of multiple running tasks (e.g., in a SMT environment) the condition generalizes in requiring that at each transition "executing-idle" there is at least one "ready-task slot" available.

This mechanism allows the hiding of the loading of the data for the next task. The hiding is fully realized when the previous task is long enough to embrace the entire duration of the loading.

Because the jobs are bundled at run time the input dataset must be initially read on a "per job" basis. Only after all of the input datasets of the participating jobs have been written into the register file are the jobs physically bundled. Thereafter, the datasets of the jobs can only be jointly accessed from packed registers as opposed to being individually accessible. A restricted region of the register file is reserved for non-packed registers, in which the load of the input datasets can take place. This region is called an "Input buffer" (or, equivalently, an "I-buffer"). I-buffers represent an implementation of the ready-task slots. To speed up the data loading phase an additional write port may be added to the I-buffers.

It is noted that the condition that enables the activation of the operation of data loading (i.e., the availability of an empty I-buffer) can only occur after the data that was previously contained in an I-buffer has been consumed by the currently executing tasks. For this reason data loading can be activated after a delay from the beginning of the execution of the previous task.

Although the present invention has been described in detail, those skilled in the art will understand that various changes, substitutions, and alterations herein may be made without departing from the spirit and scope of the invention it its broadest form.

What is claimed is:

1. An apparatus for executing at least one single program multiple data (SPMD) program, said apparatus comprising:
   a micro single instruction multiple data (SIMD) unit associated with a microprocessor; and
   a job buffer having an output coupled to an input of said micro SIMD unit, wherein said job buffer is configured to:
   at runtime, compare a job status of a plurality of jobs;
   dynamically bundle a subset of said plurality of jobs into a task based on an equivalence of a job status of said jobs; and
   allocate said task to said micro SIMD unit, and
   wherein said job status comprises a program counter value and a loop-counter list, and wherein a job is a combination of a program and an input data-set.

2. The apparatus as set forth in claim 1 wherein said micro SIMD unit is configured to send job status information to said job buffer.

3. The apparatus as set forth in claim 1 wherein said at least one SPMD program comprises a plurality of input data streams having moderate diversification of control flows.

4. The apparatus as set forth in claim 3 wherein said apparatus is configured to execute said at least one SPMD program once for each input data stream of said plurality of input data streams.

5. The apparatus as set forth in claim 4 wherein said apparatus is configured to generate an instruction stream for each input data stream of said plurality of input data streams.

6. The apparatus as set forth in claim 3 wherein said apparatus is configured to execute a plurality of SPMD programs and wherein each SPMD program of said plurality of SPMD programs is executed on a number of input data streams.

7. The apparatus as set forth in claim 6 wherein said number of input data streams is greater than a program granularity threshold.

8. The apparatus as set forth in claim 1 wherein said apparatus is configured to perform job clustering to form a job bundle in which each job in said job bundle has an equivalent control flow.

9. The apparatus as set forth in claim 8 wherein said apparatus is configured to perform said job clustering based on a job processing status of said jobs in said job bundle.

10. The apparatus as set forth in claim 1 wherein said apparatus is configured to force a task to terminate at a point where a job control path might fork by placing a code-stop in said task.

11. The apparatus as set forth in claim 10 wherein said apparatus is configured to minimize a required number of code-stops to be placed in said task by excluding from code-stop placement each control flow statements that is equivalent to a select instruction.

12. The apparatus as set forth in claim 8 wherein said apparatus is configured to maximize a size of a job cluster by selecting tasks for execution in which a job processing status of each of said tasks is complete.

13. The apparatus as set forth in claim 1 wherein said apparatus is configured to execute a data loading phase for a task before said apparatus executes a task execution phase for said task.

14. A method for executing at least one single program multiple data (SPMD) program, said method comprising:
   at runtime, comparing a job status of a plurality of jobs;
   dynamically bundling a subset of said plurality of jobs into a task based on an equivalence of a job status of said jobs; and in a job buffer, allocating said task to a micro single instruction multiple data (SIMD) unit, wherein said micro SIMD unit is associated with a microprocessor, and said job buffer has an output coupled to an input of said micro SIMD unit, wherein said job status comprises a program counter value and a loop-counter list, and wherein a job is a combination of a program and an input data-set.

15. The method as set forth in claim 14 further comprising: sending job status information from said SIMD unit to said job buffer.

16. The method as set forth in claim 14 wherein said at least one SPMD program comprises a plurality of input data streams having moderate diversification of control flows.

17. The method as set forth in claim 16 further comprising: executing said at least one SPMD program once for each input data stream of said plurality of input data streams.

18. The method as set forth in claim 17 further comprising: generating an instruction stream for each input data stream of said plurality of input data streams.

19. The method as set forth in claim 16 further comprising: executing a plurality of SPMD programs; and
executing each SPMD program of said plurality of SPMD programs on a number of input data streams.

20. The method as set forth in claim 19 wherein said number of input data streams is greater than a program granularity threshold.

21. The method as set forth in claim 14 further comprising: performing job clustering to form a job bundle in which each job in said job bundle has an equivalent control flow.

22. The method as set forth in claim 21 further comprising: performing said job clustering based on a job processing status of said jobs in said job bundle.

23. The method as set forth in claim 14 further comprising: forcing a task to terminate at a point where a job control path might fork by placing a code-stop in said task.

24. The method as set forth in claim 23 further comprising: minimizing a required number of code-stops to be placed in said task by excluding from code-stop placement each control flow statements that is equivalent to a select instruction.

25. The method as set forth in claim 21 further comprising: maximizing a size of a job cluster by selecting tasks for execution in which a job processing status of each of said tasks is complete.

26. The method as set forth in claim 14 further comprising: executing a data loading phase for a task before executing a task execution phase for said task.

* * * * *